Patented June 22, 1943

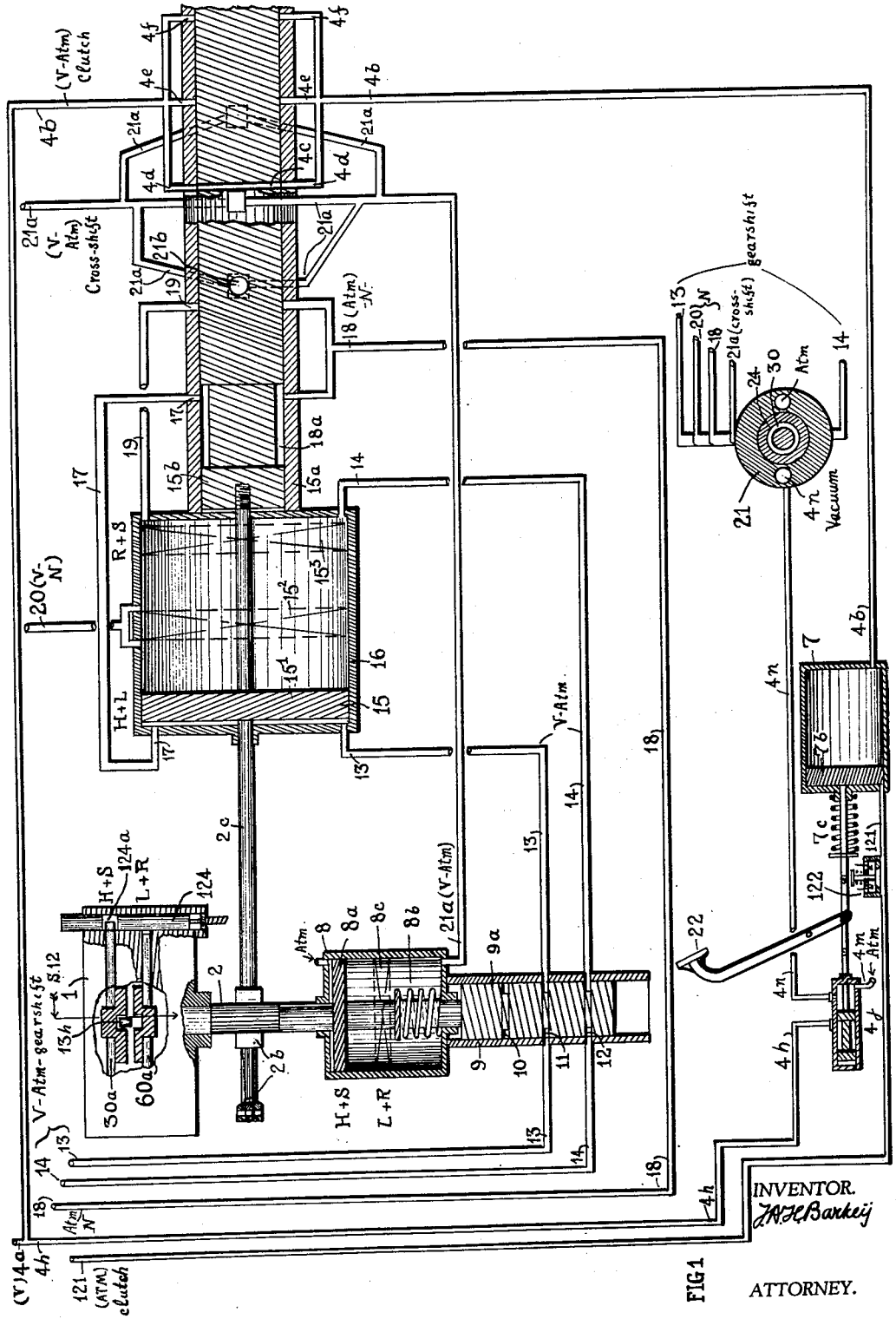

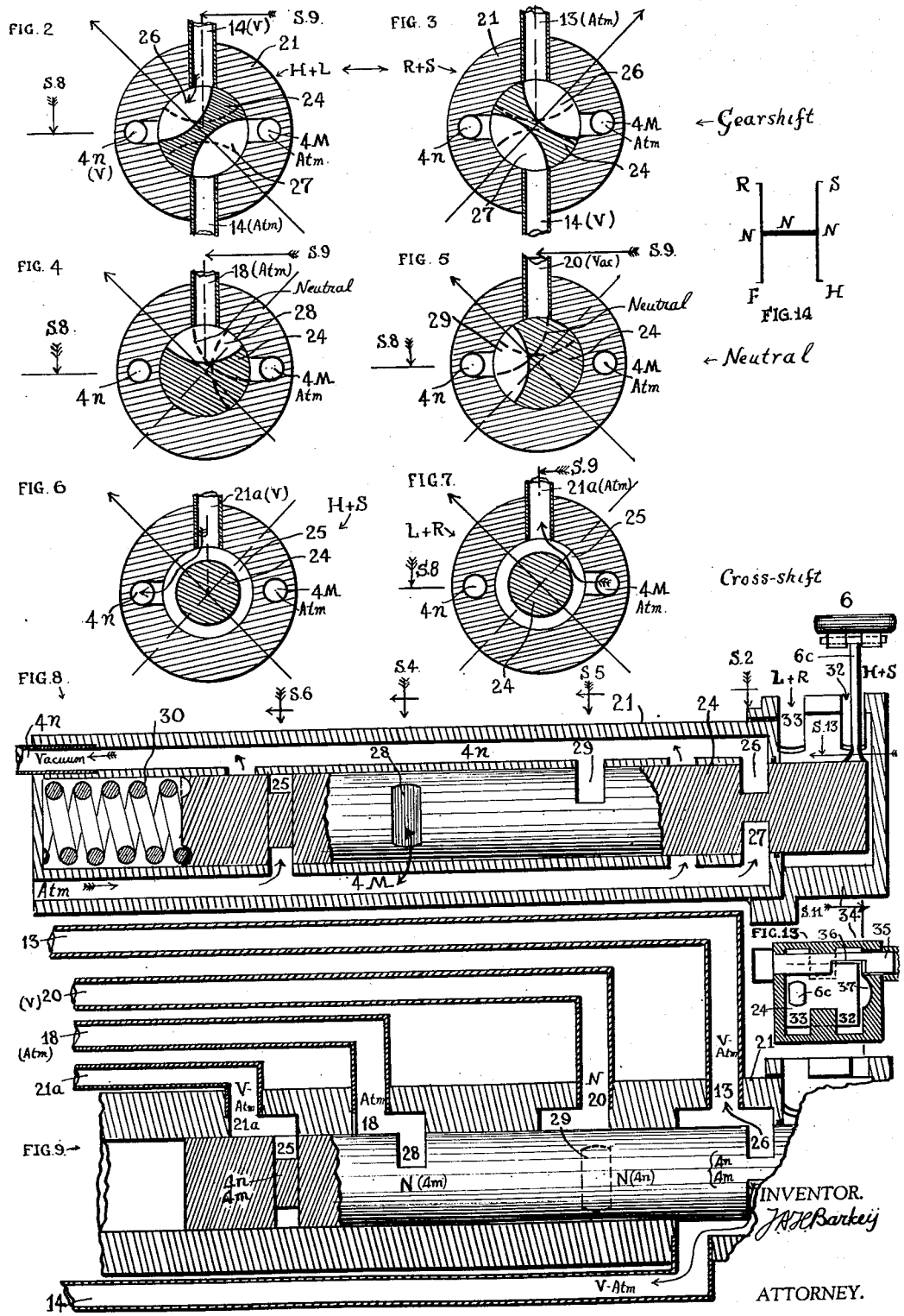

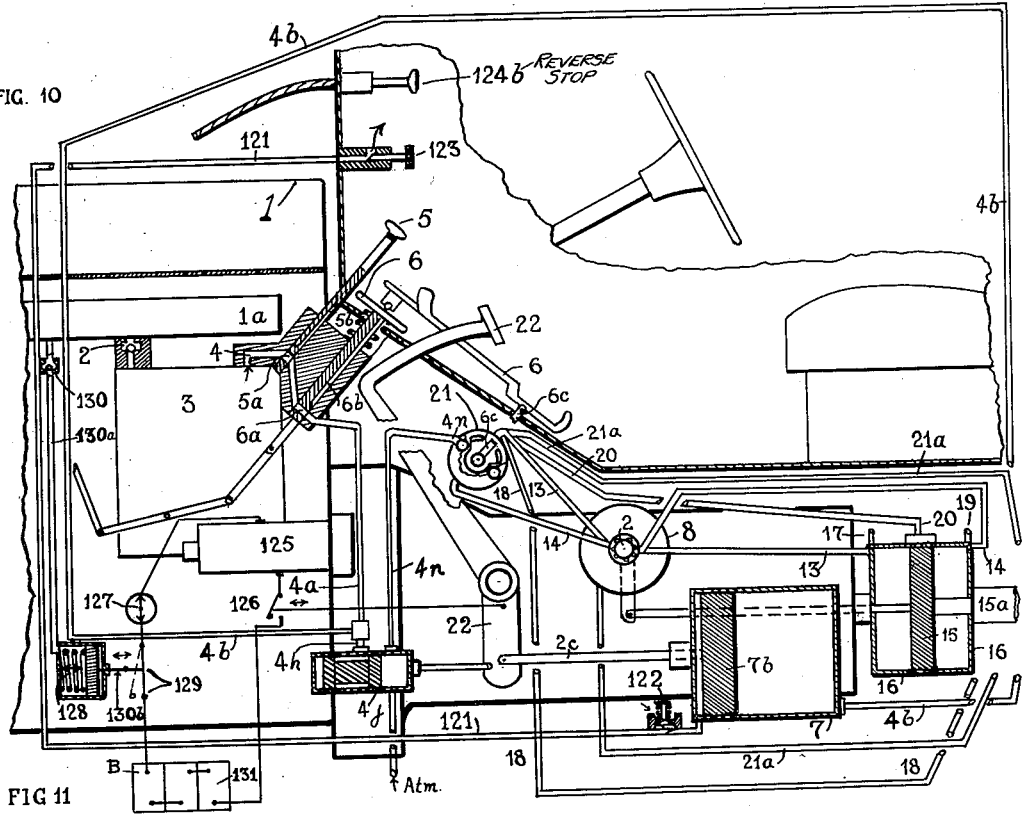

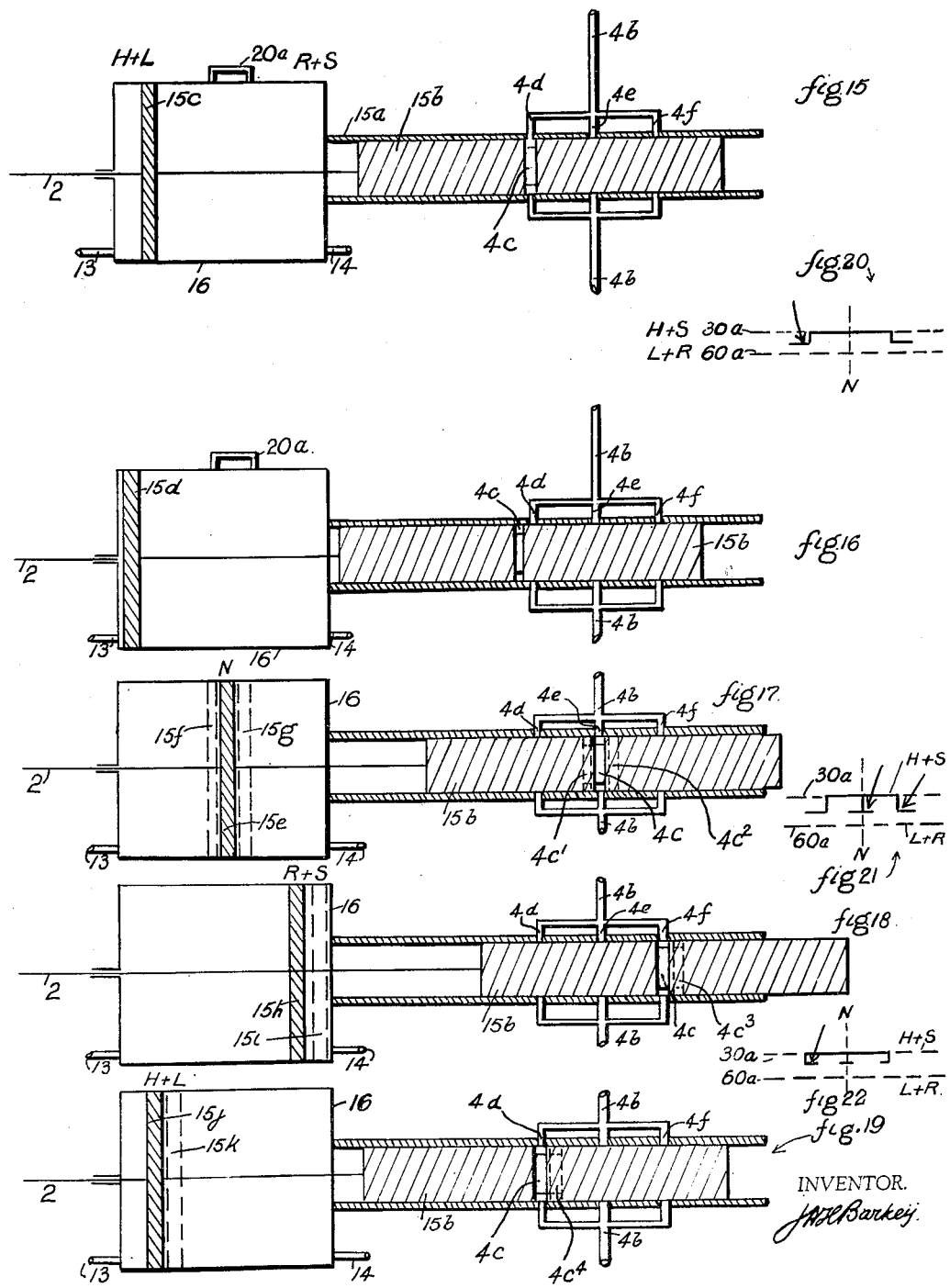

2,322,411

UNITED STATES PATENT OFFICE 2,322,411

SEMIAUTOMATIC GEAR SHIFT TRANSMISSION TOGETHER WITH A COMBINED FUEL CONTROL ELEMENT AND GEARSHIFTER

Jean A. H. Barkeij, Altadena, Calif.

Application March 1, 1937, Serial No. 128,368

6 Claims. (Cl. 192—.01)

The present invention continues the principle of my previous invention in my application No. 676,646 of June 20, 1933, in which the fuel control element (hereby is meant the accelerator in combination with the throttle actually controlling the amount of fuel admitted to the internal combustion engine, or engine in general, so that whenever the accelerator is actuated with the foot or hand the throttle is actuated, the two forming in a sense an inseparable unit) controls the power means for operating the clutch and the power means for operating the gearshift, but the operation of the latter means are dependent upon the operation of said first power means. These two applications have the following features in common, to wit, (1) the accelerator pedal (called hereinafter shortly accelerator) controls the clutch and gearshift (by valves 6a, 6b, Fig. 10), (2) the clutch movement controls the gearshift movement by a valve (4j in Figs. 1 and 10), (3) additional valves to cut into and out of action the control of the accelerator over the clutch (by valve $5^2$ and 5c, 5d in Fig. 11) and to cut into and out of action the control of the accelerator over the gearshift (by valve $5^1$, 5a and 5b in Fig. 11), (4) additional valve to cut into or out of action the control of the accelerator over clutch and gearshift both and simultaneously (by valve 5, 5a, 5b), (5) a vacuum reservoir to assist the vacuum temporarily when the engine is under a great load and the vacuum is low in the inlet manifold of the engine, (6) the clutch-operated valve 4j admits not only subatmospheric pressure to the power means for the gearshift, but also the atmospheric pressure, (7) to operate the clutch and the gearshift manually in case either the power means for the clutch or the gearshift are cut out by said additional valves, or both are cut out simultaneously. (See pedal 22 and hole in top of lever 13h in Figs. 11 and 12 respectively.)

In the present application, however, the reengagement of the clutch is made dependent again upon the operation of the power means of the gearshift, and this feature is closely related to my new type of combined accelerator (or fuel control element) and gearshifter.

My further object is to combine a small gearshift lever operating the power means of the gearshift with the accelerator pedal, in such a way that the gearshift cannot be made unless the clutch is disengaged and the clutch cannot engage subsequently unless the gearshift is made.

A further object is to provide a mechanism of the character referred to which is wholly mechanical, completely eliminating electrical control circuits and automatic vacuum valves and diaphragms of which the operation depends upon a differential pressure.

A further object is to provide novel means to effect a gearshift in an H-type transmission by means of an interrelated or reciprocal arrangement between the power means of the crossshift and the power means to shift the various gears in mesh, in such a way that said first power means operate only when the gearshift is in neutral and the second power means operate only when the cross-shift-power means have reached their outer position in either direction.

A further object is to provide means to eliminate the power means of the clutch and gearshift simultaneously or each separately. Especially to provide means to eliminate only the power means for the gearshift, or only the power means of the clutch in order to operate the engine as brake for the car when going down hill.

A further object is to provide means to eliminate the possibility of shifting in reverse accidentally by means of the accelerator.

A further object is to eliminate the possibility of shifting in second gear.

A further object is to disengage the clutch quickly and at a constant rate, and to provide means to engage at a rate suiting the operator.

Other objects and advantages of the invention will be explained in the following description.

In the drawings I show a preferred embodiment of the invention.

Fig. 1 is a general diagrammatic drawing of a gear box and vacuum power means, for shifting the gears. It shows further means to control both of said power means by means of the clutch movement and further means to control the return movement of said clutch movement by the power means of said gearshift, and additional means to control the rate of the reengagement of the clutch means.

It further shows means to control the rate of engagement of the clutch from the dashboard, which may be used, of course, independent of any semi-automatic gearshift, but is closely related thereto to make such gearshift easy enough to warrant the complication.

Fig. 2 is a vertical, transverse, cross section on the section line 2—2 of Fig. 8, when the piston 24 is in the position as shown in Fig. 2, which will be described later on.

Fig. 3 represents the same cross-section of Fig. 2, but the valve 24 therein is rotated 90° in clockwise direction.

Figs. 4 and 5 refer to that part of the main selector valve effecting by the groove 28 and the groove 29 in the cylinder 24 (see Figs. 8 and 9) the two neutral positions, respectively between first and reverse gear drive, and between high and second geardrive.

Fig. 4 is a vertical, transverse, cross-section of the main control valve 21 on the section line 4—4 of Fig. 8.

Fig. 5 is a vertical, transverse, cross-section, of the main control valve 21 on the section line 5—5 of Fig. 8, showing a passage 29, controlling, in contradistinction to the passage 26 of Fig. 4, the admission of vacuum through pipe 20 to the center or middle part of the fluid motor 16 to bring the piston therein in the center position, indicated by $15^2$ in Fig. 1. Passage 29 therefore controls the communication between the vacuum line 4n, separated by the control valve 4j from the vacuum line 4a, controlled by the accelerator pedal 6, if no free wheel mechanism is involved in the gear transmission (as explained in my previous application 676,646) and the pipe 20, leading to the center of the fluid motor 16. In the following description it should be observed that these two figures in combination indicate that the pipe 18 and 20, respectively for atmospheric pressure and vacuum, cooperate in this sense, that if the line 18 receives atmospheric pressure, the line 20 receives always vacuum, and if the line 18 is entirely cut off from the atmospheric pressure, line 20 is entirely cut off from the vacuum. The line 20 is not controlled by any other valve, but line 18 is further controlled by valve 15b, (as will be described later) to the piston rod of the fluid motor 16 for the longitudinal shift.

Figs. 6 and 7 show again a vertical, cross section of the main control valve 21 of Fig. 8 on the section line 6—6 (S6) thereof. An annular passage 25 in the piston 24 establishes connection between the vacuum line 4n, or the atmospheric line 4M, and the pipe 21a, connected with one end of the fluid motor 8, depending upon a longitudinal shift of the piston 24 in valve 21.

Figs. 8 and 9 are longitudinal cross sections of the main control valve 21, and one is a section thereof at 90° to the other. The horizontal section of Fig. 8 corresponds with the section lines S8 shown in Figs. 2, 4, 5 and 7, and Fig. 9 corresponds with the section line S9 of the same figures.

Fig. 10 is a side elevation of a portion of a motor vehicle power plant, showing the invention applied, and this figure practically shows in side view the arrangements of the various main, essential parts, of the arrangement of Fig. 1, together with additional related parts.

Fig. 11 is a similar elevation more particularly of the connection of my accelerator with the main control valve for my gear-shift, and showing separate control means to cut out either the power means of the gearshift, or those of the clutch.

Fig. 12 is transverse elevation through the gear box 1, of Fig. 1, the shift rods and the gearshift lever connected with the power means to shift said rods and engage the gears.

Fig. 13 is a top view of a modification of the bracket 34 forming the guide for the H-shift. It shows further a plunger to be operated from the dashboard in order to block either the reverse gear or the second gear position. In Fig. 11 the position of this plunger is shown in transverse view, in that part of the drawings referring to the control valve 21.

It further shows a mechanism between the toe-end of the pedal 6 and the heel-end of the pedal 6, by which it is impossible for the heel-end to move unless the toe-end of the pedal is up. If the motor 8 for the cross-shift is eliminated the gearshift lever 13h must assist the motor 15 when a gearshift is made.

Fig. 14 shows diagrammatically the six gearshift positions which have to be effected by the two fluid motors 15 and 8 of Fig. 1, the low, second, high and reverse gear positions, and the two neutral positions, between low and reverse, and between high and second respectively.

Figs. 15 to 19 explain the function of the gearshift lever 13h in relation to the clutch motor 7, and Figs. 20, 21, 22 show diagrammatically the path travelled by the gearshift lever.

Referring to Fig. 1, the main control valve 21 in the lower right hand corner has attached to it, the ends of the pipe lines 18, 14, 13, 20 and 21a, so that these ends of the pipe lines at the top end of the page meets the ends of the pipe lines connected to the main control valve 21 at the bottom of the page.

The line 4a, which splits into two lines, one 4b controlling the fluid motor 7 of the clutch, one 4h, which leads to a valve 4j controlled by the clutch movement of the said fluid motor 7, and the other line 121, controlling the rate of engagement of the clutch, are outside the main control valve 21.

The numeral 1 indicates the gear box, having two shift rods 30a and 60a, the latter shift rod being restrained from reaching reverse position by a plunger 124, operated by a cable and lever 124b from the dashboard as shown in Fig. 10.

The lower end of the gearshift lever 13h is rocked back and forth and sideways by means of the shaft 2, having a ball and socket joint as shown more clearly in Fig. 12. To the shaft 2 is splined an arm, 2b, connected to an arm 2c of the piston 15 in the fluid motor 16, making the gearshift. The splines allow the smaller servomotor 8 and piston 8a, to rock the lever 13h sideways. This movement allows the four usual gearshift positions, and two neutral positions.

Directly connected to the main fluid motor 15 is a control valve 15a, 15b, piston 15a having three indentions controlling three main pipe lines. Indention 18a controlling, together with the vacuum line 20 connected to the center of the motor, the neutral position of piston 15, the admission of atmospheric pressure on either side of the piston 15; indention or hole 21b to control the pipe line 21a for the fluid motor 8 for the cross shift; and indention 4c to control in line 4b the vacuum pressure to the servo-motor 7 for disengagement of the clutch, and the atmospheric pressure in line 4b for reengagement of the clutch, said movements taking place before a gearshift is made and after it is made respectively. The line 4b is split in three branches on either of the control valve 15b, respectively 4d, 4e, and 4f corresponding to the three positions piston 15 may assume. The line 21a is equally split in three branches, all named 21a however.

In motor 8, the piston 8a is forced by a spring 8b to engage the lever 13h with the shift rod 30a.

Connected to said power means 8, is another control-valve cylinder 9, having a piston 9a connected to said rod 2, said piston having also three passages therein 10, 11, 12, controlling thereby only two lines 13 and 14, which control the gearshift of the fluid motor 16. In either position of the piston 8a (engaging thereby the shift-lever 13h with either the shift rod 30a or with the shift rod 60a) these passages establish connection for the lines 13 and 14 on either side of said control valve, controlling thereby the vacuum or atmospheric pressure prevailing in said lines to effect selectively various gearshifts by means of the fluid motor 15, 16.

The pipe lines 13, 14, 18, 21a and 20 control all the positions of the shiftable members between the gears, and all these pipe lines are subject to the main control valve 21 actuated by the foot accelerator and this main control valve is subject to the clutch-position, which is subject to the accelerator-pedal 6 and additional control valve 5. The line 4b controls the vacuum or atmospheric pressure to the fluid motor 7, and this line merges with the line 4h, leading to the control valve 4j, actuated by the clutch movement, which line is controlled, as shown in Fig. 10, by a control valve 6 connected with the accelerator of the engine, it stands to reason that the accelerator movement controls the power means of clutch and gearshift both, controlling three fluid motors. The toe of the pedal 6 controls therefore the heel of the pedal, controlling main control valve 21, and reversely the heel control controls the tip end control of the pedal as we will see, in connection with the mechanism 132 to 139 of Fig. 11.

The fluid motor 7 for the clutch, has on the other side of the piston 7b therein an atmospheric connection 121, having a valve 122, which opens readily to admit atmospheric pressure to the left side of the piston 7b, when vacuum prevails on the right side of said piston by means of line 4b, to disengage the clutch quickly. But when the line 4b admits the atmospheric pressure on the right side by means of the passage 6b in the control valve 6 of Fig. 10, and passage 4c in the control valve 15b, of Fig. 1, this valve 122 closes by the spring, and the piston 7b returning to the left forces the air on the left side of the piston 7b into the atmosphere through the line 121 to a valve 123 on the dashboard. This valve, 123, consists of a needle valve, which decreases and increases the area of the passage for the air escaping to the left side of the piston 7b, when reengaging the clutch.

In Fig. 10 is further shown that all these lines and three fluid motors are again controlled by an additional valve 5, which may eliminate all fluid motors independent of the accelerator position and the control valve 6, 6a and 6b.

In Fig. 11, I show merely a variation thereof, whereby one valve 5¹ controls only the power means of the gearshift, and another valve 5² which controls only the fluid motor for the clutch.

On the second sheet I have explained diagrammatically the features of the main control valve 21, having a piston therein with five grooves—25, 26, 27, 28, 29, communicating with two main passages, a vacuum passage 4n, and an atmospheric passage 4m, running through the wall of the cylinder 21 from one end to almost the other end thereof. A spring 30 urges this piston to the right, so that the arm 6c at the right end thereof may move radially in a slot 32 for high and second gear positions, or in slot 33 for low and reverse positions. The top end of said arm 6c is rotatably attached to the heel-end of the accelerator pedal 6, the front end thereof operating the throttle and controlling the fluid motors of clutch and gearshift simultaneously in one modification, as shown in Fig. 10 and Fig. 11. One accelerator pedal controls therefore engine, clutch and gearshift.

The various pipe lines controlling the two fluid motors are arranged perpendicularly to said two main passages, all of them being arranged at the top thereof, except the line 14, leading to the right side of the motor 16. All lines 13, 14, and 18, 20, and 21a are controlled by control valve 21, the lines 13, 14 and 21a receiving alternatively vacuum or atmospheric pressure, line 18 receiving only atmospheric pressure and line 20 receiving only vacuum.

In Fig. 10, I show the diagrammatic representation of my combination as applied on a car showing their various relations as they will appear approximately in an actual construction on a car of standard design at the present time.

This figure shows in addition to Fig. 1, that the pipe 4a (4b and 4h merged) is controlled by two valves, valve 6a, 6b connected with the accelerator, valve 5a, 5b controlling again said valve 6a and 6b, placing the power means of clutch and gearshift out of operation.

The pipe 4 leading to said control valves 5 and 6 communicates with a reservoir 3, connected with the manifold 1a by means of a ball-valve 2, opening towards the manifold when the vacuum therein is momentarily greater than in the tank 3, so that always a reserve vacuum power is retained for moments that the subatmospheric pressure in the manifold is rather low, when the load on the engine is great.

Fig. 11 shows only on a magnified scale the combination of the foot accelerator and throttle with the main control valve 21, and shows further separate control valves 5¹ for the gearshift and 5² for the clutch. It shows further a cam-mechanism, to allow the movement of the heel of the pedal 6, when the toe-end is in released position, cutting the gas off. The operation is as follows. Assuming the various parts to be in the position shown in Fig. 1, and the operator steps on it, (assuming valve 5 being in open position, that means admitting vacuum to the entire system) the vacuum power will propagate through line 4a, then in line 4b, through arm 4d and passage 4c, to motor 7, pulling the piston to the right, disengaging the clutch. The valve 122 in pipe line 121 is sucked open, the spring thereon being very light, and the right side of the motor is readily filled. The lower end of clutch pedal 22 moves to the right, opening subsequently the line 4h to the line 4n by means of the control valve 4j attached thereto. The vacuum enters the main passage 4n in the main control valve 21, and in the position of the piston 24 therein, vacuum enters from 4n to passage 26 connected to line 13 of the motor 16, placing or keeping this piston 15 therein to the left corresponding to the high or low gear position therein. See the position of valve 24 in Fig. 2, and note the positions of these passages when the valve is rotated only 45° in clockwise direction, and the position thereof in Fig. 3 in full lines when rotated 90° so that second gear is engaged.

When rotating the piston 24 in the valve 21, 90° to the position shown in Fig. 3, second gear is engaged, reversing the conditions in the two lines 13 and 14 communicating with the two ends of the cylinder 16. At the same time passage 25 in piston 24 establishes communication all the time between 4M and 21a. Such a rotation of 90° of the valve, leaving the handle 6c of the piston 24 (see Figs. 8 and 9) in the slot 32 of the bracket 34, brings temporarily into play the passages 28, 29 and the pipe lines 18 and 20, but this merely serves to bring the piston 15 temporarily in neutral position on the way towards the other extreme position which we have to attain for said two shifts in high and second gear.

Only when sliding the piston 24 sideways so that these latter passages are bound to come into play temporarily, we reach with the arm 6c the other slot 33 in the bracket 34 to reach the low and reverse gear-positions, and passage 25 being in communication with and between 4M and pipe line 21a when the arm is in slot 32, comes now in communication between 4n and 21a bringing vacuum power to the piston 8a, compressing the spring 8b and shifting 13h towards the shift rod 60a for low and reverse gear. And when arm 6c is in slot 33, passages 26, 27 have moved in Figs. 8 and 9 to the left, but are still able to communicate alternatively with the same pipes 13 and 14 for the extreme positions of the piston 15 for low and reverse gear. Likewise passages 28 and 29 can still communicate with lines 18 and 20 respectively, because these lines 20, 18 and 13 communicate over a distance with these passages equal to the distance of the shift of piston 24.

However, all these communications are all right, but the intermediate control valves 9 and 15 control these shifts in a reciprocal way. The gearshift positions controlled by lines 13 and 14 have to be made when the cross shift is in a certain position engaging either with shift-rod 30a or 60a, therefore what is more natural than to make the gearshift dependent upon the cross shift by leading the lines through passages 10, 11, 12 controlled by the cross shift fluid motor. Conversely the cross shift has also to depend upon the positions of the piston 15 in the fluid motor 15. Therefore the line 21a should be controlled by the control valve 15b connected to piston 15, splitting preferably again the line 21a in three branches and piston 8a may receive either vacuum or atmospheric pressure during the three possible positions of piston 15.

Supposing we left the car in the garage in low gear position, what usually happens, we had to start the motor first, which has to be done by means of the clutch pedal manually, which pedal closes a switch 126 to start the electric or fluid motor 125 (see Fig. 1). As soon as the motor is moving and we desire to let the clutch engage, we first have to move the accelerator to a neutral position in which the lever 6c, attached to the heel of the pedal 6, takes a vertical position as shown in bracket 34, Fig. 11. In that position we cut off the lines 13 and 14, see Figs. 2 and 3, from the piston 15, and we connect the main passage 4M by passage 28 with line 18, and the main passage 4n by passage 29 in piston 24, with the line 20, so that the line 18 (being independent of the control valve 9 and 9a) feeds through the passage 18a, in piston 15b, and only to line 17, atmospheric pressure to the left of piston 15. Line 20 receiving vacuum (being independent of the valve 9 and 9a and the valve 15a, 15b) pulls the piston 15 in midposition, because line 19 is blocked by control valve 15b until the piston 15 reaches neutral position, in which case atmospheric pressure from line 18 is fed simultaneously to lines 17 and 19 on both sides of the piston 15 killing the vacuum in line 20, and producing equilibrium on both sides of piston 15. The gears are in neutral and the passage 21b connects the lines 21a on either side of the valve 15b, thereby either sending vacuum or atmospheric pressure to the motor 8 depending upon which neutral position is taken, the one between low and reverse gear, or the one between high and second gear, that means that lever 6c is either in the slot 32 or in the slot 33 in vertical position. (See Figs. 8 and 9.) (Note passage 21b and arms 21a are shown in Fig. 1 perpendicularly to branches 4d 4e, 4f and passage 4c.)

Shifting from neutral position into second position as shown in Fig. 3, line 13 receives the atmospheric pressure and line 14 the vacuum, so that the piston moves to the right, to position 15³, as shown in Fig. 1. The passage 18a in piston 15b cannot affect the movement of the piston when passing the lines 17 and 19 because line 18, atmospheric line, and line 20, vacuum line, are kept neutral when shifting into slot 32 from slot 33 with the arm 6c of the control valve 24, 21. Passages 28 and 29 establish only communication when lever is in neutral position. However, when shifting from low to second gear or from second to low the arm 6c always passes a neutral position in the H, shown to the right of Figs. 2 to 7, giving time enough to the passages 28 and 29 to establish connection between line 18 and 4M, and between line 20 and 4n, forcing the piston 15 to its neutral position 15², shown in Fig. 1, and stopping the pistons 15 and 15b long enough so that passage 21b in piston 15b brings the atmospheric pressure to line 21a in order to force the shift arm 13h to the shift rod 30a, operating the second gearshift. And while the piston 8a is moving, the lines 13 and 14 are temporarily blocked so that the piston 15, even if we shifted very fast from low gear to second gear (bringing arm 6c very fast from slot 33 to 32), would be always temporarily blocked and held in neutral position, because in second gear position, we do have vacuum in line 14, atmospheric pressure in line 13, and atmospheric pressure in line 21a so that the spring 8b forces the shift lever 13h to the shift rod 30a for high and second gear.

In Fig. 1 is shown that the line 21a is split in three branches on either side of the valve 15b. This construction may be combined with the arrangement of the gearshift lever 13h and the indentions of the shift rod 30a and 60a, as shown in Fig. 1, so that when the lower end of the gearshift lever is forced in either one of these two indentions, it cannot leave said indention when either shift rod is in any gear position, because the parts or claws on these shift rods having said indentions have flat and smooth sides where they face each other and are adjacent to each other. If the line 21a exerts a force on lever 13h either by vacuum, or atmospheric pressure combined with spring pressure of 8b, before it has shifted sideways to the other rod in neutral position, the lower end of shift lever 13h cannot move in between these claws or parts, having the indention therefore.

In Fig. 12 I have shown a small variation thereof, in which these two claws on the two shift rods are so far apart that the lower end of the shift lever 13h may be midway between the two. If such an arrangement is used, it stands to reason that the outer two branches of the line 21a should be omitted, using only the center branch for neutral position. Therefore when the shift rod 30a or 60a is in a gear position and the valve 15b cannot establish communication by passage 21b for line 21a, because only the central arm of line 21a on either side of valve 15b is used, I rely upon the vacuum still lingering in fluid motor 8, 8a to keep the shift lever 13h in the indention of shift rod 60a until neutral position is reached.

Equally when the shift lever 13h is in the indention of the shift rod 30a, atmospheric pressure is or has been admitted to the fluid motor 8, 8a before, and the vacuum cannot start to operate through line 21a to shift said lever to the other shift rod until again neutral position is reached, using only the central branch of line 21a on either side of valve 15b, making connection through passage 21b in said neutral position.

The time passing between each shift from one shift rod to the other is in normal operation seldom beyond 5 to 60 minutes, so that the fluid motor 8, 8a and cooperating parts should retain enough vacuum to keep the shift lever on the shift rod where it belongs until neutral position is reached.

The alternative construction is, as explained, to construct the shift rods and indentions as shown in Fig. 1, so that, if the shift, preselected by main control valve 21, is towards the other shift rod, the outer branches of line 21a may start to force the shift lever initially towards the other shift rod but is prevented to fall into the indention of the other shift rod and slides over the flat surface of the claw of the other shift rod until neutral position is reached.

Either construction may be used, and applicant preferred to show both as being adaptable to the general relation of the parts and functions shown in Fig. 1.

And the construction of Fig. 1 can, if preferred, be combined with the three branches of line 21a on either side of the valve 15b.

It is further understood that the fluid motor 8 for the cross shift may be operated manually, by eliminating pipe line 21a, the passages 21b in the piston rod 15b of the fluid motor 16, and the passage 21a as connected to the selector valve 21. After the selector valve has been set preselectively for a certain gearshift, the cross shift is made manually and controls at the same time the entire gearshift. The vacuum power is then used to assist the gearshift, and if the valve 4j is also eliminated and the clutch operated manually instead of by vacuum-power means, the gearshift becomes obviously entirely a manually operated shift but assisted by the vacuum power. If the valve 4j is not eliminated, it is a manual-power operated shift.

All valves controlling the gearshift are all mechanically operated and in this respect the manual shift would differ from all the previous gearshifts in which additional automatic valves control either a gearshift effected solely by vacuum power, or a gearshift partially effected by vacuum power and partially by hand. And also from all gearshifts applying other additional fluid-operated power means to effect a gearshift.

Likewise the fluid motor or the power means to disengage and engage the clutch may be eliminated and the pipe line 4b, valves 4c, 4d, 4e, 4f, and the entire gearshift may be reduced to a gearshift partly manually, partly power-operated, but in such a sense that the actuation of the power means are dependent upon the manual shifting means 13h.

The Figs. 15 to 22 explain how the gearshift lever 13h, when it is used for a gearshift, may also control the clutch motor 7.

In Fig. 15, the piston 15 in position 15c, has shifted either into high or low gear position. When the driver moves the lower end of the gear shift lever between the rods 30a and 60a, as shown in Fig. 12, he can move the valve 4c out of registry with passage 4d, as shown in Fig. 16, position 15d for piston 15, as shown in Fig. 16.

Therefore before the next shift can be made at all, the driver has to bring passages 4c and 4d into registry before the motor 15 can operate, because the clutch has first to disengage before the valve 4j admits vacuum to motor 15.

Or the driver may move the gearshift lever from the position of Fig. 15 to the position $4c^4$ of Fig. 19, in which case the gearshift lever equally controls the next operation of clutch and gearshift.

In Fig. 16 the shift is continued in the same direction, in Fig. 19 in opposite direction. Fig. 20 shows diagrammatically the approximate path made by the gearshift lever for the shift from Fig. 15 to Fig. 19.

In Fig. 17 I show what happens when the piston 15 is in position 15e, neutral position. Passage 4c registers with passage 4e, and when the driver moves the gearshift lever 13h between the shift rods and 60a, he can move the piston 15 either to a position to the right or to the left, as shown in dotted lines (indicated by $4c^1$ and $4c^2$).

The driver has to bring again the valve 15b to the position 4c in Fig. 17, before the next shift and disengagement of the clutch can take place.

Fig. 21 shows the path of the gearshift lever for Fig. 17.

In Fig. 18, I show the position of the piston 15, when either second of reverse gearshift has been reached, position 15h. Likewise here, the valve 4c is shifted by the driver to position $4c^2$, and it stands to reason that before the next shift can be made the driver has to move the valve 15b back to the position shown in full lines in Fig. 18.

The arrow to the right of Fig. 21 shows diagrammatically the motion of the lever towards and in high gear position.

In Fig. 19, I show that the driver may move the lever 13h in opposite direction if he so chooses, although it makes the gearshift motion slightly more complicated, because he has to travel at the end of the shift in opposite direction, while in all shifts as shown in Figs. 15, 16, 18 he continues to shift in the same direction but between the rods, making a slight sideways motion as he does for any cross-shift already.

The arrow in Fig. 22 to the left, shows the path travelled.

The main point is this that the gearshift lever has additional control over the clutch operation besides the accelerator, and is able to cut off the vacuum and atmospheric pressure to motor 7.

The other main point is that the driver has control over his gearshift at all times, even if the motor stops to run.

The normal operation of the gearshift and clutch operation is therefore done at all times by means of the accelerator and gearshift lever both. In my next application No. 399,556, the gearshift lever likewise controls the clutch motor and at the same time the gearshift.

In the present more primitive arrangement the same control exists. The gearshift lever controls also the gearshift itself because when moving the gearshift lever between the rods 30a and 60a, it is evident that the lever cuts off the vacuum and atmospheric pressure through the pipes 13 and 14 to motor 15.

As soon as the lever has engaged the brackets of the shift rods 30a and 60a, as shown in Fig. 1, the lever establishes direct communication between inlet manifold and the motor 15 by means of passages 10, 11, 12. Therefore the gearshift lever controls the clutch and gearshift besides the accelerator, and the one can overrule the other.

It is therefore clear that the passages 28 and 29 for the neutral position of the piston 15 in $15^2$ position of Fig. 1, and the passage 25 in main control valve 24, form a double check together with the passages in valve 15b, that the piston 15 is always brought in neutral position in any gearshift from one shift-rod to the other shift rod, the pistons 15 and 15b being controlled and stopped temporarily by the shifting of the passages 10, 11, 12 of valve 9a, and piston 8a being blocked conversely by the passage 21b in the piston 15b connected to the servo piston 15.

Shifting from second gear in high involves again bringing the pasages 26 and 27 from the position in Fig. 3 back to that of Fig. 2, so that line 13 receives vacuum, and line 14 atmospheric pressure, and passage 25 in piston 24 remains in communication with main passage 4M in valve 21, and line 21a sending atmospheric pressure to the fluid motor 8, because one of the three branches 21a thereon communicated with passage 21b in either one of the three possible positions.

Shifting from low gear into reverse is impossible on account of a plunger 124 blocking the shift rod 60a, and preventing a reverse gear position accidentally which may cause serious damage to the car. (See Fig. 1 and Fig. 10.) A knob 124b on the dashboard when pulled out frees the shift rod 60a for parking purposes. Any other means, like a shifting resistance in the piston 24 in the valve 21 may be used, but the present structure preventing such a shift more positively, because when freeing the shift rod 60a by offering a passage therefore in a hole 124a in the plunger 124 it blocks the shift rod 30a, however, from going into second gear. If we forget to bring the knob 124b on the dashboard back in blocking position for the reverse gear, we block second gear and we are reminded to block reverse. When starting from parking in first gear and then shifting into second, one is positively reminded, because second gear is blocked. Therefore this structure is preferred and great damage is not possible because, when starting in low and putting in gear accidentally the reverse gear the car has always little speed. Another modification of this check is described hereinafter.

Finally I will describe the check the gearshift mechanism has on the reengagement of the clutch. Combining the accelerator pedal with the gearshift has attractive features, but one great drawback is that the clutch may engage before the shift is made. Therefore, the gearshift must be made with mechanism preventing that accidental stepping on the gas can do any harm when the gearshift is not entirely accomplished, preventing thereby stripping of the gear teeth.

In Fig. 1 and in Fig. 10, is shown that the line 4a has an arm or branch 4b leading to the control valve 15b, connected with piston 15, the main fluid motor of the gearshift. As explained, this valve 15b has a passage 4c, establishing connection between the three arms 4d, 4e, 4f of the line 4b on either side of said valve. Therefore, as soon as the piston 15 begins to move from neutral position, or either outermost position, it blocks the line 4b and at the same time blocks the accelerator 6 from sending atmospheric pressure through the line 4b to free the action of the spring 7c to engage the clutch, or clutch pedal 22, shown in Figs. 1, 10 and 11.

When intending to make a gearshift, we can do this preselectively (without the mechanism 132 to 138 to be described next) with the present arrangement, so that when we keep up our tip of our right foot, shutting off the gas, the motor 7 gets first the vacuum force, through line 4b to the right of the piston, disengaging the clutch. Thereafter, when the clutch is entirely free, the valve 4j sends the vacuum power through the selector valve 21 then to the motor 15, and eventually to the motor 8. The piston 15 starts moving, breaking immediately the vacuum in line 4b, but retaining it to the right of piston 7b, a time sufficient to let the piston 15 reach their other position, be this neutral or another gear position. When it (15) has reached such a position, the passage 4c does not block any longer the line 4b, and when stepping on the gas the gearshift must have been made. (In the diagrammatic figure of Fig. 1 it is, of course, understood that the passage 21b, controls only line 21a and motor 8, and the line 4b controls only the piston 7b). When it (15) has not reached such a position, the piston 7b cannot possibly reengage the clutch, being blocked at 4c.

It is therefore evident, that accidentally stepping on the gas when making a shift, cannot do any harm, because after reaching finally the desired gear it is possible to hold the tip of our foot up in the proper position, and long enough, to have a gearshift made. This interrelated and reciprocal relation between clutch movement and gearshift allows us to combine the gearshift with the accelerator pedal.

In Fig. 12 I have shown the gas pedal 6 hinged at 6e to the lever 6c of the main control valve 21, and the toe-end thereof has attached on its undersurface an arm 6d having a ball and socket, adapted to slide on a small platform, 6f, attached to the control valve 6a, 6b, connected with the throttle.

When shifting gears the emphasis is laid on the heel-end of the pedal, making with the foot the same movement as with a gearshift lever but over a smaller distance.

After a shift is made preselectively, the emphasis must be laid on the toe-end of the pedal to step on the gas.

The structure shown (without the mechanism 132 to 138 of Fig. 11) is merely a preferred arrangement, it being possible to hinge by ball and socket the toe-end of the pedal 6 to the top end of an intermediate rod hinged by ball and socket at its lower end to the top of the valve 6a, 6b. In other words, a ball and socket on either end of an intermediate rod, located between valve 6a, 6b and toe-end of pedal 6, the heel-end remaining hinged to the arm 6c of valve 24, as shown in Fig. 11.

In Fig. 1, the passages 10, 11, 12 in the valve 9a, and the passages 18a in valve 15b can be constructed by narrowing down the diameter of the piston in the valve, the passage 21b, and passage 4c, each being preferably a single hole to prevent passage 21b to establish at any time communication between the two lines 4b on either side of the valve. However, any other shape of passages or mechanically driven valves will do, depending upon the space available and the cheapest construction possible.

It is further understood that I may use any other type of gear-shift having a plurality of operative positions, for instance one in which a straight shift is made in one direction from low to second to high gear, and reverse, eliminating the bend of the H as in the present arrangement. I have shown such a gearshift in an application No. 676,646, now Patent No. 2,261,898 dated Nov. 4, 1941, and it would be superflous to show it here again. Such a gearshift would have advantages for the present combined throttle-gear shift-pedal, because the nasty curve in the H will be avoided, which is easier to make with the hand than with the foot, though both movements are manual.

In order to prevent the toe-end of the pedal to give gas, unless the heel-end of the pedal has made a gearshift, I may embody with the other features explained, another construction indicated by the numbers 132 to 138. Equally, this structure prevents that the heel-end cannot make a gearshift unless gas is cut off and the engine idling. However, naturally, by this structure the desirable feature of preselection is suspended, because it stands to reason that if gas is cut off, the motor 7 works, the clutch is disengaged and whatever gearshift is chosen by the heel-end of the pedal or rather by the driver, is immediately effected by the interrelated mechanism of fluid motor and gearshift as explained. But in so far as this feature may be desirable for the weaker sex, which, however, buys the cars for the stronger sex, I will include it.

The lower end of valve 6a, 6b, I connect with an arm 132 attached to a shaft 133 having a fulcrum in a bearing 140. On shaft 133 is a cam, 134, capable of moving shaft 135 back and forth in a bearing 136 of the bracket 34, a spring 139 effecting the return movement. The lower end of arm 6c I provide with three flat faces arranged at 45° to each other. These three flat faces allow the shaft 135 to slide therebelow when the arm 6c assumes either one of three positions necessary to reach the three gear positions, in each of the slots 33 and 32 of the segmental bracket 34 shown in Figs. 8, 9 and 13. Therefore when any of the six gear positions (two thereof being neutral) has been assumed by the heel of the pedal 6, the toe-end can be depressed to give gas, and the mechanism 132, 133, 134, 135, 139, bearing 137 and bearing 136, slides the shaft 135 under one of these flat faces 138 depending upon the gear position chosen, and thereby blocks temporarily the possibility of mind and or heel to assume another gear position. This can only be done by raising the toe-end of the pedal 6, whereby the right end of the rod 135 frees the flat face 138 on the arm 6c, and this position allows the heel to change the gear position. This mechanism has the further advantage of steadying the feet of the weaker sex, and in addition thereto of helping the stronger sex not to forget to avoid the reverse gear, because the toe-movement will help the heel-movement not to forget, and rod 35 of Fig. 11 in bracket 34 becomes superfluous, somewhat.

Finally I will describe the starting mechanism of the entire combination at the end, because this mechanism is not directly a part of the semi-automatic gearshift, and yet it is an important part thereof, because the operation of the fluid motors depend upon the rotation of the internal combustion engine, and no gearshift can be made (provided the gearshift lever, which can be stuck in the upper ball and socket joint of the lever 13h shown in Fig. 12 is eliminated) unless there is a vacuum in tank 3. This vacuum may remain therein for quite a while, depending primarily upon the accurate fit of valves 5, 6 and 4j, but disappears over night. For that reason, I connect the starter 125 in an electrical circuit, having a manual switch at 127, (see Fig. 10) and another switch 129, actuated by a small fluid motor, 128, directly connected by a pipe line, 130a, but via a blow-back valve 131, to the manifold, and third switch 126 operated by the clutch pedal.

When closing the throttle by the pedal 6, and thereby disengaging the clutch, I close the circuit every time at 126 (switch 127 being also closed when starting), but these two closed switches cannot start the motor because so long as the motor runs, the vacuum in the inlet manifold pulls the piston in fluid motor 128 to the left, breaking the circuit at 129 (shown in closed position because the motor does not run now). When the motor accidentally stops for some reason, the switch 129 is closed but the switch 126 is open, and the operator has to step on the clutch pedal to close the second switch to start the motor unless the vacuum in the tank 3 is strong enough to keep the clutch disengaged and switch 126 closed, in which latter case, the electric motor 125 will start the internal combustion engine automatically and continuously, and breaks the circuit by the switch 129 and 126, continuously when the internal combustion engine starts. Therefore the following condition and description refers only to the exceptional case that the vacuum in tank 3 is not strong enough to keep the clutch in disengaged position, which condition may arise within 5 minutes or several hours depending upon the tight fit of the different parts and pipes involved, and the effectiveness of the ball valve 2. If these parts are accurately made and assembled, the switch 127 has to be turned on only because the clutch is still disengaged, to start the motor and internal combustion engine, (the clutch is still disengaged from the vacuum in the tank 3 if sufficiently large of course) when the internal combustion engine has been stopped by the breaking of the circuit for the electric ignition of the internal combustion engine, which circuit may be broken simultaneously with the switch 127 of the circuit of the motor 125. If the operator is on a train track, the train approaches and he stalls his motor, he has the natural tendency to step on either the clutch or on the foot pedal 6, and if he has his car in gear and releases the clutch he has a chance to escape, because the internal combustion engine will be started and all he has to do next is to release the clutch pedal and then step on it. It is not fool-proof, but an approach to it. The main feature of this structure is, that it is impossible to ruin the starter, or the teeth on starter and fly-wheel, because if the clutch is engaged the switch 126 is open, and if the clutch is disengaged, the switch 129 is closed or open depending upon the fact whether the motor is dead or alive, which condition may run parallel with your own condition in the next moment.

Finally I will describe a variation of the shift rod-lock 124a and 124b, shown in Fig. 1 in gear box 1.

It is evident that the pedal 6 can be held by the foot easily in the extreme positions of the slots 32 and 33 in the segmental H-bracket or housing 34 shown in Figs. 8, 9. In order to hold the pedal 6 equally easy in the vertical, neutral position of the arm 6c, I provide in said bracket 34 a similar plunger 35, having an indentation 36. I reciprocate this plunger in the same way as the plunger 124a in the gearshift-housing by means of a flexible cable and knob 124b shown on the dashboard of Fig. 10. When this plunger is in the position shown in Fig. 13 on the second sheet, the arm 6c cannot possibly be moved in the reverse gear position, but can be moved through the two 90° angles of the H towards the second gear position on account of the said indention 36. Therefore we can for the shift rod 60a of the low and reverse gear position maintain easily neutral position, when the plunger 35 is in the position shown in Fig. 13. In order to obtain said advantage for neutral position also for the shift rod 30a for high and low gear, I provide the housing 34 with an indention 37 opposite the central passage of the H, and the spring 30 will have a tendency, when shifting from one shift rod to the other, to force the arm 6c in the indention 37 of the housing. Equally when shifting from high to second and reversely the spring 30 will always have a tendency to force the arm 6c in this indention 37 in neutral position, unless we press our foot or rather heel forcibly towards the outer two positions for high and second gear. (It is understood that the mechanism 132 to 139 makes indention 37 superfluous.)

In Fig. 11 on the third sheet, I have shown the position of this plunger 35 in end view (transverse view, perpendicular to the axis of the main control valve 21), when the arm, 6c, is in the slot 33 for low and reverse gear, and I have indicated the slot 36, which is coinciding in that position with the slot 32 of the bracket 34, by a dotted line. Here, as in the structure of the plunger 124 and indention or hole 124a, when the reverse gear is blocked, the second gear is open, and reversely when the second gear is blocked the reverse gear is open, so that we are constantly reminded when parking is over, to bring the plunger 35 back in the position shown in Fig. 13.

Various adaptations and modifications are obvious and fall under the scope of the following claims, in which the fluid motor is called sometimes broadly an actuator.

I claim:

1. In a gearshift mechanism for automobiles, a fluid power operated clutch and a fluid power operated gearshift in which all gearshifts are effected by a single bidirectional motor, both controlled by the fuel control element of the engine, said fluid operated gearshift capable of operating only when said clutch is disengaged and said clutch being only capable of re-engaging when said power operated gearshift by said single motor has been completed.

2. In a gearshift mechanism for automobiles, a manually operated clutch and a fluid power operated gearshift, said gearshift being controlled by the fuel control element of the engine, said fluid operated gearshift comprising a single, bidirectional fluid motor, a selector valve between said control of said fuel control element and said motor establishing in any of its selective positions direct communication between the source of fluid controlled by said fuel control element and said fluid motor, and adapted to operate only when said fuel control element is reduced substantially to idling position, and dependent on said manually operated clutch.

3. In an automatic gearshift a source of vacuum controlled by the fuel control element of an engine, mechanism to effect gearshifts in a gear transmission, said mechanism moved by said vacuum and comprising a single bidirectional motor, a two-way clutch between said engine and gear transmission also operated by a mechanism moved by said vacuum, and all gearshifts therein being controlled by the said fuel control element and by said clutch when said fuel control element is reduced substantially to idling position, said latter element controlling a selector valve to select said gearshifts.

4. In an automatic gearshift, a power operated clutch and a power operated gearshift including a single bidirectional motor effecting all gearshifts therein, valvular means to co-ordinate the disengagement and engagement of said clutch with said gearshifts, said valvular means being associated with the fuel control element of an engine, said fuel control element controlling each and every gearshift.

5. In an automatic gearshift, an engine connected by a two-way clutch to a sliding gear transmission, fluid power means to effect automatically gearshifts in said transmission, said gearshifts controlled by the fuel control of an engine, and said gearshifts being effected when said fuel control element is substantially reduced to idling position of the engine and dependent on the disengaged position of the said two-way clutch, said fluid power means comprising a single bidirectional vacuum motor, a selector valve between said control of the said fuel control element and said vacuum motor, establishing communication between the source of vacuum and said vacuum motor in any of its selective positions.

6. In combination with a prime mover, a fuel control element therefor, a gear transmission, vacuum power means to effect automatically a gearshift therein comprising a single bidirectional vacuum motor, a selector valve located between a source of vacuum created by said prime mover and said vacuum motor, said selector valve having at least two selective positions, reversing the vacuum between said source and opposite sides of a single piston in the single cylinder of said motor, and establishing in each of said positions direct communication between said source of vacuum and said motor, said automatic gearshift being dependent on the engagement and disengagement of a two-way clutch between said prime mover and said gear transmission, and dependent upon the position of said fuel control element when reduced substantially to idling position.

JEAN A. H. BARKEIJ.